H. Z. COBB.
BRAIDED FABRIC AND PROCESS OF MAKING IT.
APPLICATION FILED MAY 28, 1907.
937,021.
Patented Oct. 12, 1909.
5 SHEETS—SHEET 1.
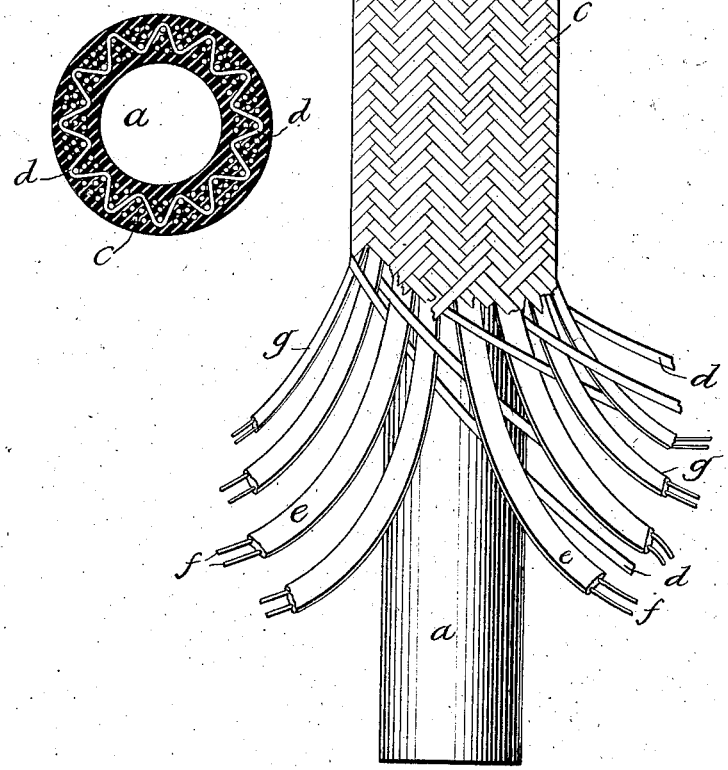
WITNESSES:
INVENTOR:
Henry Z. Cobb,
By Attorneys, H. Z. COBB.
BRAIDED FABRIC AND PROCESS OF MAKING IT.
APPLICATION FILED MAY 28, 1907.
937,021.
Patented Oct. 12, 1909.
5 SHEETS—SHEET 2.
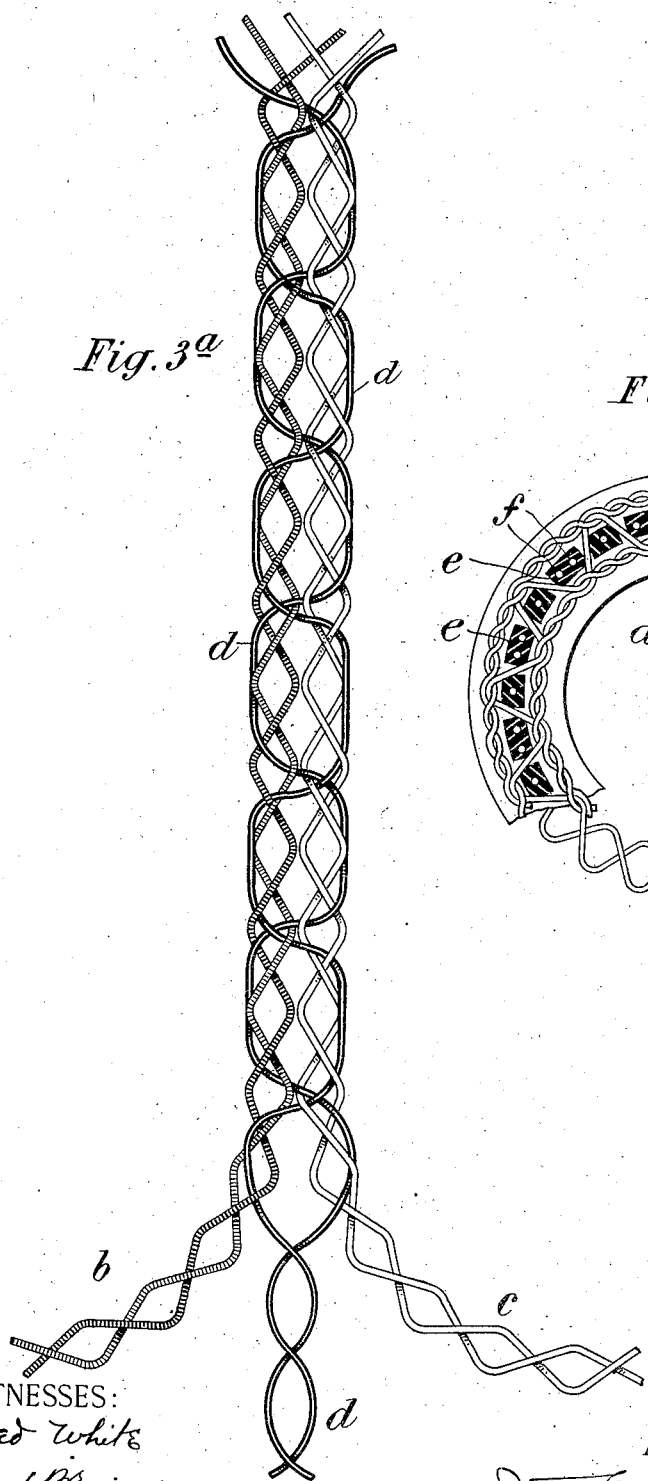
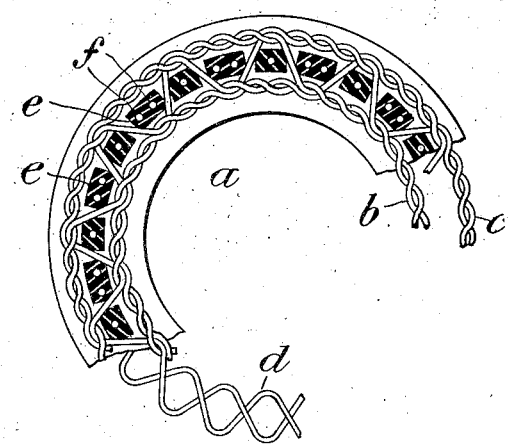
Fig. 3ª
Fig. 3.
WITNESSES:
Fred White
Reneˊ Buine
INVENTOR:
Henry Z. Cobb,
By Attorneys,

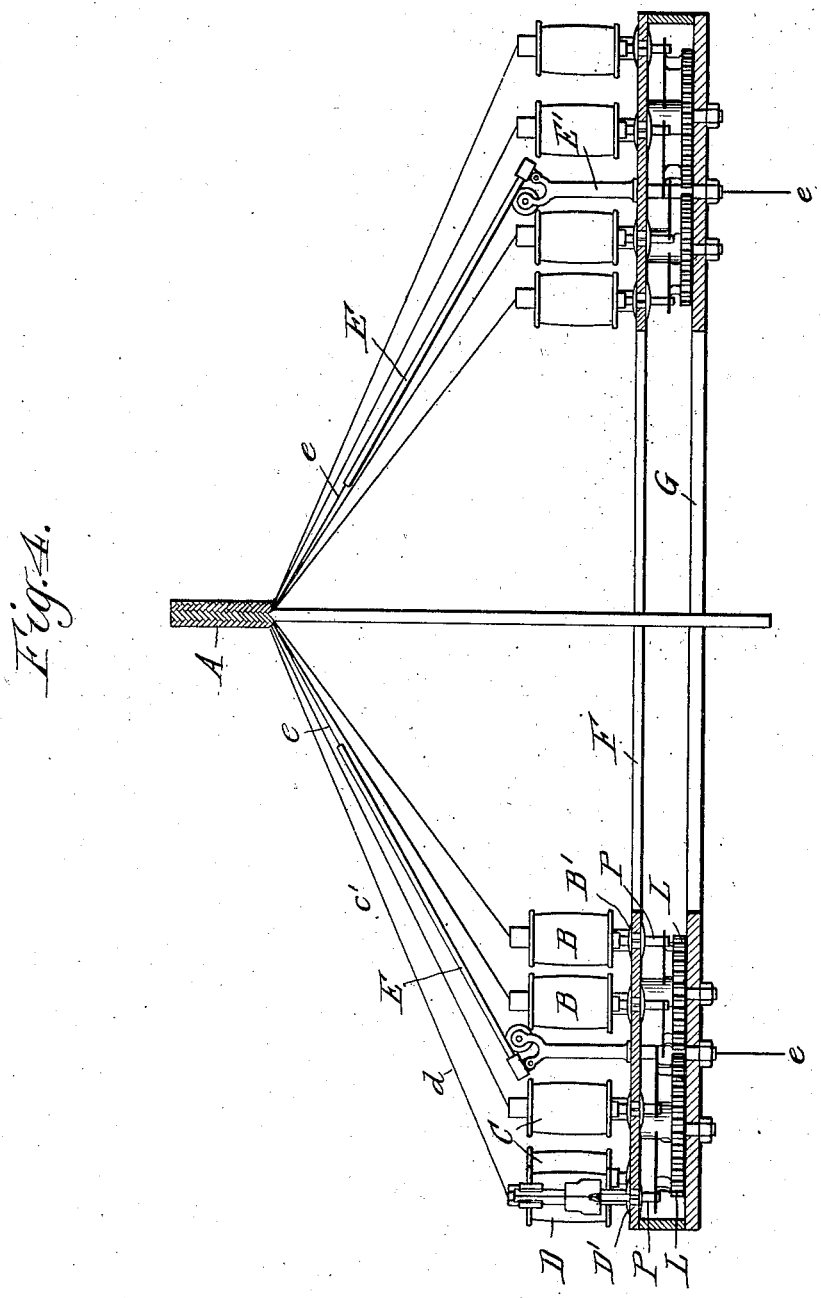

H. Z. COBB.
BRAIDED FABRIC AND PROCESS OF MAKING IT.
APPLICATION FILED MAY 28, 1907.
937,021.
Patented Oct. 12, 1909.
5 SHEETS—SHEET 4.
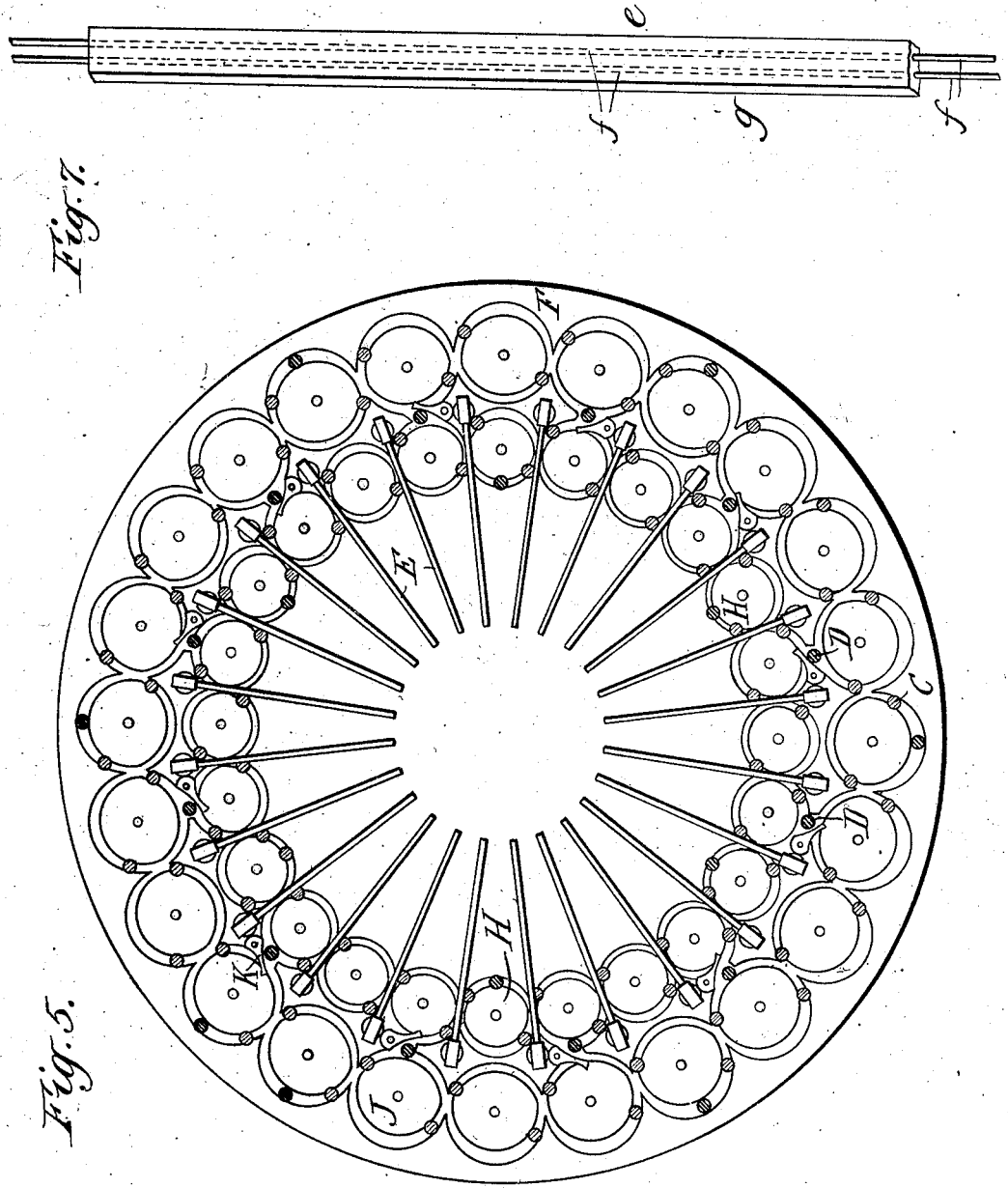
WITNESSES:
INVENTOR:
Henry Z. Cobb,
By Attorneys,

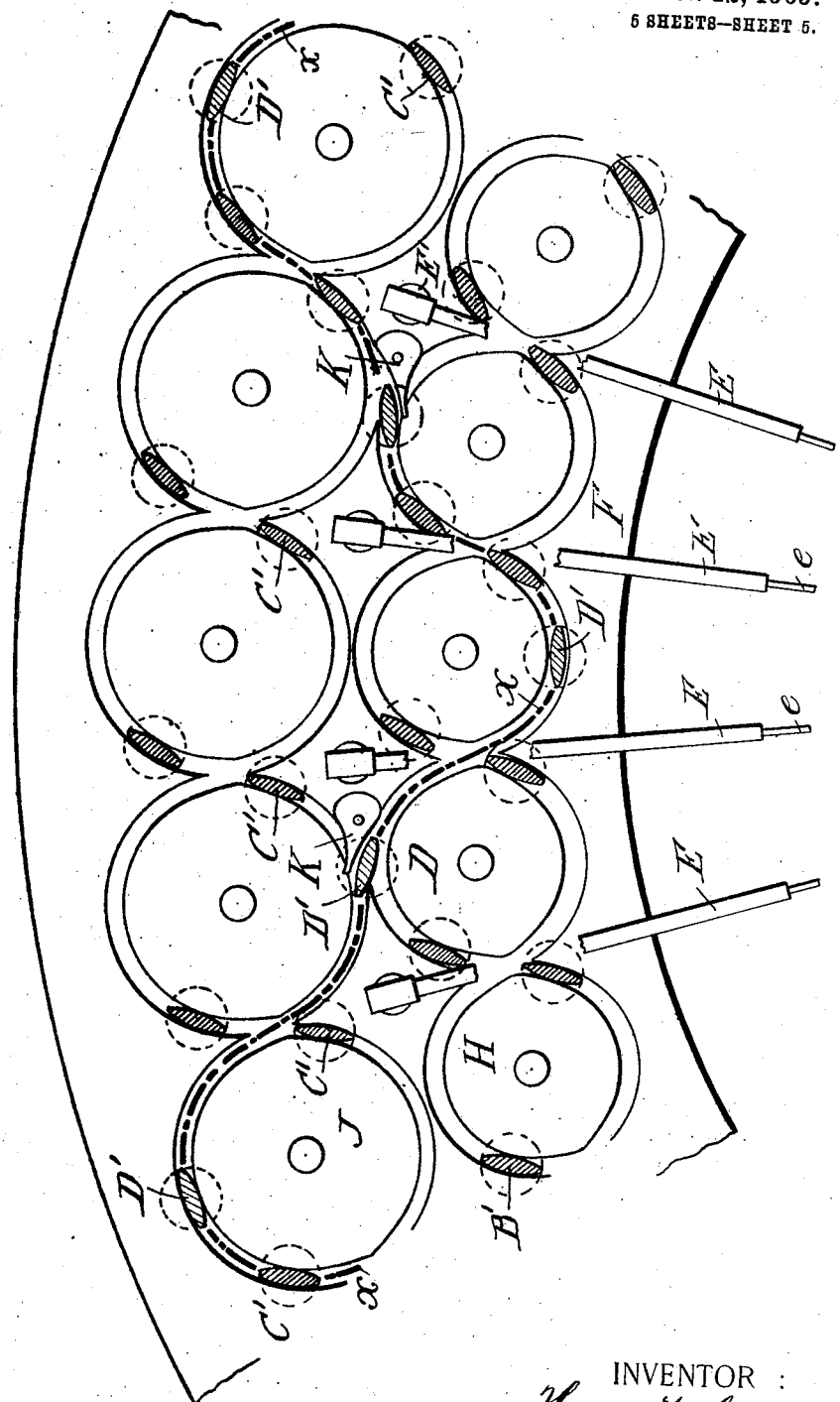

UNITED STATES PATENT OFFICE.

HENRY Z. COBB, OF CHELSEA, MASSACHUSETTS, ASSIGNOR TO REVERE RUBBER COMPANY, OF BOSTON, MASSACHUSETTS, A CORPORATION.

BRAIDED FABRIC AND PROCESS OF MAKING IT.

937,021. Specification of Letters Patent. Patented Oct. 12, 1909.

Original application filed August 6, 1906, Serial No. 329,401. Divided and this application filed May 28, 1907. Serial No. 376,193.

REISSUED

*To all whom it may concern:*

Be it known that I, HENRY Z. COBB, a citizen of the United States, residing in Chelsea, in the county of Suffolk and State of Massachusetts, have invented certain new and useful Improvements in Braided-Fabric and Processes of Making It, of which the following is a specification.

This invention provides for making a braided fabric of two or more distinct parallel webs layers or plies interlocked or interwoven by strands braided into and crossing between the layers. Between the layers are introduced longitudinal strands of textile material, rubber or wire. The fabric may be made flat for use as fabric or rubber belting; or it may be adapted for other uses. The process of making such braided fabric consists in simultaneously braiding the two (or three, four, or more) parallel layers or plies by means of two (or more) series of bobbins, those of each series traveling in opposite directions; and simultaneously locking or tying together such two (or more) braided webs by interlacing strands introduced by means of a supplemental series of bobbins crossing back and forth between the paths of the bobbins braiding the parallel layers. At the same time the intermediate longitudinal strands are introduced between those forming the parallel braided webs, and so that the interlacing strands cross back and forth between these longitudinal strands.

The apparatus for performing this braiding process comprises two or more adjacent series of tracks or races traversed by the carriers of the bobbins of the first and second series, and by the carriers for said supplemental series of bobbins, which latter carriers are caused to pass across at intervals from one pair of tracks or races to the other, suitable switches being provided to direct their crossing-over movements, and the carrier propelling mechanism being proportioned and adapted to receive this supplemental set of carriers and impart to them their proper motions crossing back and forth between the two series or pairs of races. For introducing the longitudinal strands, tubes are provided projecting between the webs emanating from the bobbins of the first and second series and directed toward the braided multiple fabric.

Figure 1 of the accompanying drawings is a partly dissected side elevation showing a braided hose in course of being formed. Fig. 2 is a transverse section of the completed hose. Fig. 3 is a transverse section showing more in detail the respective layers or webs of the braided fabric partly dissected apart. Fig. 3ª is a diagram in the nature of a longitudinal section of the fabric, but showing only two strands of each web. Fig. 4 is a vertical diametral section of the elemental parts of the braiding machine. Fig. 5 is a plan thereof, the bobbins being removed. Fig. 6 is a plan on a larger scale of a portion of the machine shown in Fig. 5. Fig. 7 shows one form of the longitudinal strands.

In Figs. 1 and 4, A is the braided fabric, and $a$ the core on which it is or may be formed. For a hose this core may be the lining tube of fine india-rubber, suitably supported. Or the core may be omitted. Around this is the inner braided layer or web $b$, and inclosing this is the outer braided layer or web $c$. These two or more webs are tied together by interlacing strands $d$, which when drawn into place pass out and in in zigzag or star form, as shown in Fig. 2. It is preferable to introduce between the inner and outer braided layers $b$ $c$ longitudinal strands $e$ $e$. These may be of textile yarn or metal wires useful for resisting longitudinal strains; or they may be rubber strips in order to introduce a web or layer of rubber between the inner and outer braided layers; or preferably they are, as shown in Fig. 7, textile yarns $f$ inclosed in a rubber strip $g$, thereby serving both purposes. Fig. 4 shows how the strands $b'$ forming the inner braided web, and the strands $c'$ forming the outer braided web, are led from the bobbins B B and C C respectively and converge conically where their strands unite to form the double braided fabric A. The intervening longitudinal strands $e$ are led by their tubular guides E which project conically between those of the inner web $b'$ and the outer web $c'$. The bobbins B C are carried upon bobbin carriers B' C' as in any ordinary braiding machine. These carriers move in zigzag tracks or races formed in the upper race plate F supported on a lower plate G as usual. There are two pairs of tracks or races, an inner one H and an outer one J. Each consists of two sinuous slots crossing each other at intervals as usual. The inner race H is traversed by the inner bobbin carriers B', whose bobbins B lay the strands b' forming the inner braided web b. The outer race J is traversed by the outer carriers C', whose bobbins C lay the strands c' forming the outer braided web c. The respective races are distinct except that at intervals cross-overs are provided controlled by switches K K (Fig. 6). The interlacing strands d are carried by a supplemental series of bobbins D (one of which is shown in Fig. 4) mounted on carriers D' which traverse the inner and outer races H and J alternately, crossing over from one to the other at the switches K, so that they follow the path of the dotted line x in Fig. 6. For driving these carriers, push-wheels L L (Fig. 4) similar to those ordinarily used in braiding machines are provided, turning between the plates F G and having radially slotted horns or forks for engaging the toes P of the carriers. They differ from those heretofore used in having six horns or slots instead of four. The guides E for the longitudinal strands are mounted each on a tubular post E' (Fig. 4), the strands e passing up from any suitable reel through this tubular post and into the inclined tubular guide E.

In making hose, the usual external coating of rubber h may be applied upon the outside of the braided web c after which the entire hose will be subjected to the usual vulcanizing process. During the vulcanizing process, the strips g g of rubber unite into one integral layer or tube of rubber between the braided layers b and c. By introducing the rubber in this manner, any desired quality or composition may be used, so that this intervening tubular layer may be of as fine quality and as impervious as the inner tube or lining a. This interposed rubber thus gives the required "friction" and adhesion, instead of being a mere filling composition. This improved hose has the distinctive advantage that its inner and outer webs are so tied together or interlaced as to effectually avoid their separation, an advantage which is especially noticeable when the hose becomes old. The hose has great strength and durability. The braided webs render the hose very supple and elastic, while affording as great strength as a multiple-ply woven hose. The process and product may be greatly varied as desired. Thus the braided layers may be more than two; the introduction of longitudinal strands e e may be omitted; or these strands instead of being of rubber may be of yarns or wires.

The invention may be used for making multiple-ply hose or fabrics of varying thicknesses. Thus for a two-ply fabric two braided layers may be used without the intervening longitudinal strands; for a three-ply fabric two braided webs and an intervening layer of longitudinal strands is used; and for thicker fabrics, any combination of the respective layers may be resorted to; as for example a five-ply fabric may be made by using three concentric series of bobbins so as to form three braided webs with two intervening layers of longitudinal strands.

This application is a division of my application No. 329,401, filed August 6, 1906, to which reference may be made for a more complete disclosure of the braiding machine.

I claim as my invention:—

1. The process which consists in simultaneously braiding a plurality of distinct and parallel webs and a distinct supplemental web of strands crossing between and interlacing with those of the parallel webs, and uniting them, and introducing rubber between the strands of the respective webs, and subsequently vulcanizing the fabric.

2. The process which consists in simultaneously braiding a plurality of distinct and parallel concentric tubular webs and a distinct supplemental web of strands crossing between and interlacing with those of the parallel webs, and uniting them, and introducing rubber between the strands of the respective webs, and subsequently vulcanizing the fabric.

3. The process of braiding which consists in simultaneously braiding a plurality of distinct and parallel webs and a distinct supplemental web of strands interlacing with those of the parallel webs, and uniting them, and simultaneously introducing between the parallel webs longitudinal strands of rubber, and subsequently vulcanizing the fabric to unite the braided webs with the intervening rubber.

4. The process which consists in simultaneously braiding a plurality of distinct and parallel concentric tubular webs and a distinct supplemental web of strands interlacing with those of said tubular webs, and uniting them, and simultaneously introducing between the parallel tubular webs longitudinal strands of rubber, and subsequently vulcanizing the fabric to unite the braided webs with the intervening rubber.

5. The improved braided fabric consisting of distinct parallel braided webs and a distinct supplemental web of interlaced braided strands uniting the parallel webs.

6. The improved hose consisting of distinct outer and inner parallel tubular braided webs, and a distinct supplemental web of braided strands uniting the parallel webs.

7. The improved braided fabric consisting of distinct parallel braided webs, intervening longitudinal strands between said webs, and a distinct supplemental web of interlaced braided strands uniting the parallel webs.

8. The improved hose consisting of distinct outer and inner parallel tubular braided webs, intervening longitudinal strands between said webs, and a distinct supplemental web of braided strands uniting the parallel webs.

9. The improved braided fabric consisting of two distinct parallel braided webs and a distinct supplemental web of braided strands uniting them, and having intervening longitudinal strands of rubber united by vulcanization to the braided webs.

10. The improved hose consisting of distinct outer and inner parallel tubular braided webs and a distinct supplemental web of interlaced braided strands uniting them, and having intervening longitudinal strands of rubber, and a lining tube of rubber, all united by vulcanization.

In witness whereof, I have hereunto signed my name in the presence of two subscribing witnesses.

HENRY Z. COBB.

Witnesses:
    JOHN S. PATTERSON,
    WALTER F. JONES.